Dec. 17, 1957          P. HONNEF          2,816,465
LAYING OUT AND DUPLICATING DEVICE
Filed Aug. 17, 1954

INVENTOR
PETER HONNEF
BY Joseph K. Schafield
ATTORNEY

United States Patent Office 2,816,465
Patented Dec. 17, 1957

2,816,465

LAYING OUT AND DUPLICATING DEVICE

Peter Honnef, Wethersfield, Conn.

Application August 17, 1954, Serial No. 450,475

4 Claims. (Cl. 77—62)

This invention relates to a laying out and duplicating device or jig and more particularly to a work holding and positioning appliance for milling, drilling and grinding machines to facilitate duplicate work pieces being successively drilled or otherwise operated on from and corresponding to a single previously drilled work piece or template.

An object of primary importance of the invention is that the appliance includes a member or table movable in directions at right angles to each other relative to a base member and on which a work piece is mounted in fixed position. On this work piece mounting member or table is also mounted in fixed position a scribed or drilled template or model having spaced markings or holes corresponding to those to be drilled, milled or ground in the work piece.

Another object of the invention that is important is that a bracket is formed on the base having a viewing opening therein into which may be placed an optical eye piece or locating pin, the position of the opening being fixed and sufficiently elevated above the work piece supporting member to permit movement of the member and work piece or template below the bracket.

Another feature of importance that enables movements of the work supporting table to be effected accurately in directions at right angles to each other is that the table is supported on pairs of parallel rods extending at right angles to each other and passing through aligned openings in the work supporting member and intermediate member respectively, one pair of these rods being mounted at their opposite ends on the base member, the other pair being fixed at their opposite ends to members slidable on the first pair of rods.

Another object of the invention is to provide means by which the position of the table may be accurately determined in both directions of its movements.

And finally, it is a feature of importance that a drill or other tool guide is provided in the form of a bushing mounted in an arm or bracket mounted in fixed position on the base member and over the table.

With the above and other objects in view, the invention may include the features of construction and operation set forth in the following specification and illustrated in the accompanying drawing.

In the accompanying drawing annexed hereto and forming a part of this specification, I have shown the invention embodied in a work piece supporting and positioning appliance applicable to the work support of a vertical drilling machine but it will be understood that the invention can be otherwise embodied and that the drawing is not to be construed as defining or limiting the scope of the invention, the claims appended to this specification being relied upon for that purpose.

In the above mentioned drawing there has been shown but two embodiments of the invention which are now deemed preferable, but it is to be understood that changes and modifications may be made within the scope of the appended claims without departing from the spirit of the invention.

Figure 1:
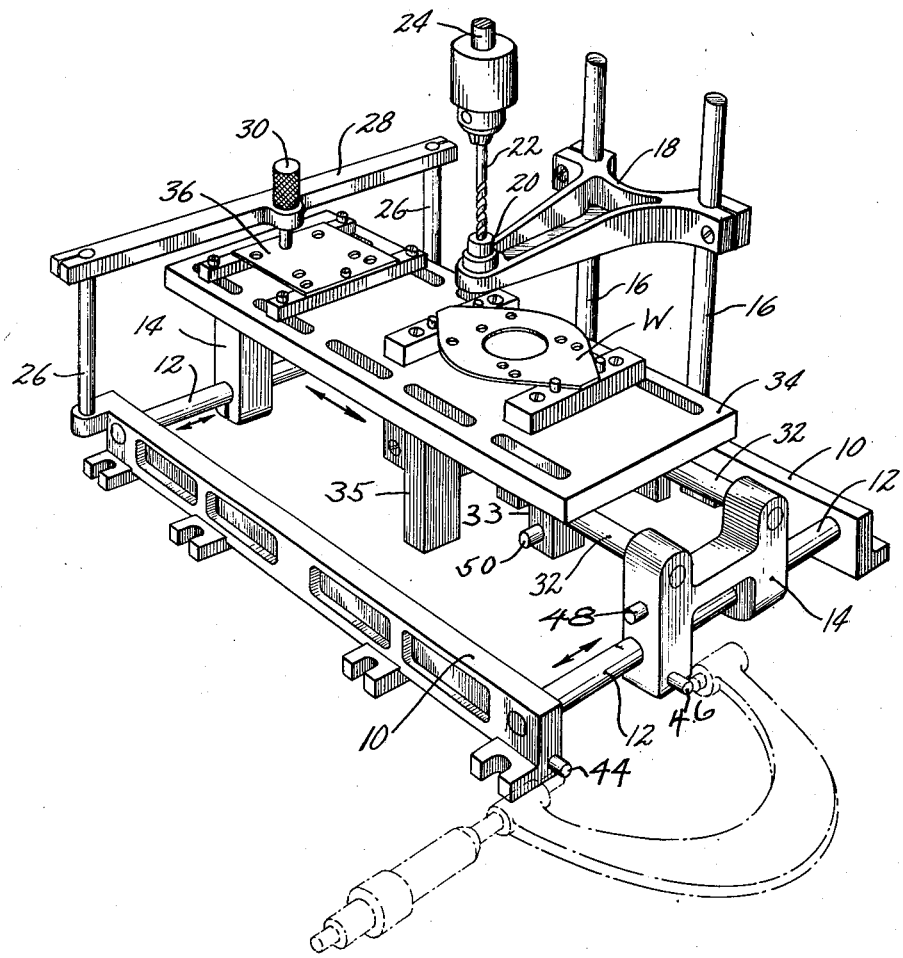
Fig. 1 is a perspective view of a preferred embodiment of the invention.

Referring more in detail to the figures of the drawing and first to Fig. 1, it will be seen that a base member is formed by two side members 10 held in fixed spaced apart position by parallel rods 12. The under surfaces of the base members 10 are suitably finished to flat surfaces in the same plane so that the base will rest firmly on a table or work support of a machine. The parallel rods 12 are sufficiently raised from the under surface of the base members 10 so that intermediate members 14 may be freely slidably mounted thereon.

Upstanding from one of the base members 10 are two vertical rods 16 which support a horizontally extending bracket 18 which may be secured to the rods 16 in any desired vertical position by suitable means. At the free end of the bracket 18 is positioned a bushing 20 for guiding a drill or other tool 22 in a vertical rotatable spindle 24. Also on the base members 10 at one end are vertical rods 26 having a horizontal transversely extending bar 28 attached to their upper ends. Centrally of this bar 28 is a vertically movable pin 30 for a purpose presently to be described.

Extending horizontally between the members 14 on the rods 12 spacing the base members 10 apart are parallel horizontal rods 32 extending at right angles to the base forming rods 12. On the longitudinally extending rods 32, which extend the full length of the appliance, is a supporting table 34 for a template or model 36 and a work piece W to be operated on. Depending lugs 33 on the table 34, but one of which is shown, are suitably bored to slidably engage the rods 32. The model 36 and work piece W are secured in fixed position on the table 34 so that the model 36 is below the pin 30 in the embodiment shown in Fig. 1 and the work piece W is below the tool positioning bushing 20.

It will be seen from the above described construction that the table 34 for the model 36 and work piece W may be moved about to any position within the capacity of the appliance in directions precisely at right angles to each other. It will also be seen that with a model, template or previously drilled work piece additional duplicate work pieces may be successively drilled or otherwise operated on. The table 34 is moved about during operation so that the pin 30 may enter each hole in the model 36 or original work piece and the work piece W will be correspondingly moved about to operate on the work piece at similar positions. Any preferred means may be employed to position the model 36 and work piece W in fixed spaced apart positions on the table 34. Also, any desired clamping means (not shown) may be employed to retain the members 14 on their rods 12 and the table 34 on its rods 32. Depending from the table 34 at an intermediate point is a lug member 35 serving to support the table against the downward pressure of the tool operating on the work piece.

Figure 2:
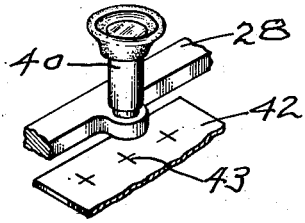
Fig. 2 is a fragmentary view showing another form of locating means.

In Fig. 2 a modified form of locating member is shown. This is in the form of a small optical eye piece 40 mounted in the transverse member 28 in place of pin 30. By this means markings on a template 42 on the table in the form of crossed lines 43 may be readily picked up accurately by cross hairs in the reticle of the eye piece of usual form.

To determine the location of the table 34 in both directions of its movement, pairs of pins 44—46 and 48—50 are provided.

By placing a micrometer or other measuring instrument over the pairs of pins the position of the table 34 in its two directions of movement may be determined to a high precision.

I claim as my invention:

1. A laying out and duplicating device comprising in combination, a base member, an intermediate member slidable thereon in one direction, a table on said intermediate member movable in a direction normal to said intermediate member, a template locating member positioned on said base and over said table, a tool guide mounted on said base spaced from said locating member and positioned over said table and template and work piece holding means on said table and pairs of parallelly extending pins outstanding respectively from said base and intermediate member and from said intermediate member and table, whereby the position of said table in both directions of its movements can be determined.

2. A laying out and duplicating device comprising in combination, a base having spaced members, parallel rods retaining said members in spaced relation to each other, an intermediate member having spaced members slidable on said rods, parallel rods retaining said intermediate members in spaced relation to each other, a table slidable on said intermediate rods, template and work piece retaining members on said table, a locating member for said template mounted on said base, a tool guiding means mounted in fixed position on said base and spaced from said locating member, and pairs of parallelly extending pins outstanding respectively from said base and intermediate member and from said intermediate member and table, whereby the position of said table in both directions of its movements can be determined.

3. A laying out and duplicating device comprising in combination, a base, a template and work piece mounting table thereon movable in directions at right angles to each other, template and work piece holding means on said table, an axially movable pin supported in fixed position on said base and adapted to engage a template on said table, tool guiding means supported in fixed position on the base and over said table, and pairs of parallelly extending pins outstanding respectively from said base and intermediate member and from said intermediate member and table, whereby the position of said table in both directions of its movements can be determined.

4. A laying out and duplicating device comprising in combination, a base, a template and work piece mounting table thereon movable in directions at right angles to each other, template and work piece holding means on said table, an optical eye piece supported in fixed position on said base to locate markings on a template on said table, tool guiding means supported in fixed position on the base and over said table, and pairs of parallelly extending pins outstanding respectively from said base and intermediate member and from said intermediate member and table, whereby the position of said table in both directions of its movements can be determined.

References Cited in the file of this patent

UNITED STATES PATENTS

| 447,014 | Pryibil | Feb. 24, 1891 |
| 2,166,692 | Ray | July 18, 1939 |
| 2,268,293 | Lundeberg | Dec. 30, 1941 |
| 2,674,139 | Stern | Apr. 6, 1954 |

FOREIGN PATENTS

| 863,437 | Germany | Jan. 19, 1953 |